Patented Oct. 10, 1939

2,175,352

UNITED STATES PATENT OFFICE 2,175,352

DEAIRING OF SHEEP CARCASSES

Herman H. Hazekamp, Chicago, Ill., assignor to Armour and Company, Chicago, Ill., a corporation of Illinois No Drawing. Application February 17, 1938, Serial No. 190,947

4 Claims. (Cl. 17—45)

The present invention has to do with a new method for treatment of animal carcasses whereby to improve the appearance and consequent saleability as presented to the trade; also the keeping qualities, prevention of surface discoloration due to oxidation and consequent attack by putrefactive organisms.

The invention is particularly applicable to the carcasses of sheep generally and especially lambs. Animal hides are underlain by a thin membranous tissue or "fel", separating the skin proper from the flesh. This fel, in the case of cattle, is of firm body and a substantial portion of the same is removed with the hide by the skinning knife, whereas in the case of sheep and lambs the pelt is pulled off the body by manual force except for cutting along the legs and about the neck. An effort is made to leave the fel intact as a cover protection for the flesh from the atmosphere with attendant oxidation and attack by bacteria. These conditions present in the case of sheep and lambs are also measurably present in the case of young calves, where the flesh is also tender, and the fel constitutes a protective covering, and here also an attempt is made to leave the fel intact.

In the case of sheep and lambs, however, the fel is especially thin and adheres with relatively little tenacity to the flesh. It has been the experience of packers throughout the years that in pulling the pelt or fleece from the carcass the fel is often loosened from the underlying flesh in spots and even ruptured, especially for a space of several inches along both sides of the back. The partial vacuum produced by this loosening causes air to accumulate thereunder, forming pockets which may be likened to air blisters; also if there be a slight lesion water may enter beneath the fel during the subsequent scrubbing operation, thus forming a water pocket or blister.

These blisters greatly detract from the appearance of the carcass and where present necessitate its relegation to an inferior classification selling at a reduced price. Buyers carefully inspect each carcass not only by sight but by feel. They test by feel for flesh firmness, fat distribution and the like. The presence of air and water blisters not only depreciates the quality from the standpoint of appearance but lends to the carcass a mushy spongy feel, which causes it to be rejected by buyers for the better trade, hotels and retail markets of the better class. Consequently, blistered carcasses having such rough spongy backs must be graded under a lower classification, selling at a less price. The several grades or classifications represent a very considerable range in sales value.

Notwithstanding the recognition of these facts, meat packers have hitherto been content to use their best efforts to prevent the formation of these air and water pockets in the course of removing the pelt and have accepted their presence where unavoidable as an irremedial disadvantage which may, depending upon the extent, require sale at a reduced price with less profit. In some instances prominent air blisters have been pricked to permit escape of the trapped air, but such puncture breaks the protective sealing effect of the fel and permits the entrance of wash water and bacteria.

Never, to my knowledge, has any treatment been devised or practiced looking to the eradication of such blisters with a view to retention of the carcass in that classification in which it would otherwise rightfully belong.

I have discovered that these air or water pockets or blisters can be entirely eliminated by rubbing the affected area of the carcass, after dehiding, with considerable pressure towards openings provided by the severing of the fel at the neck and leg ends or intermediate ruptured openings. To a certain extent also the fel is permeable and small air pockets thereunder may be dissipated by pressure rubbing over a limited area surrounding such pockets. I have found that this pressure rubbing is most effectively applied by the bare hand of the operator, although supplemental means may at times be found to be practicable and even preferable.

By such treatment, after pelting and before refrigerating, the carcass is much improved in appearance and feel, a higher classification with increased sales profit is attained, discoloration by oxidation is prevented, and the keeping qualities are greatly enhanced by thus sealing against the entrance of putrefactive organisms. These advantages and others follow upon a treatment which is simple but which has never occurred to those skilled in this art as the solution of a problem which has so long been recognized as unwelcome but unsolvable.

I claim:

1. That method of treating sheep and lamb carcasses which consists in pressure rubbing after pelting and prior to refrigeration to eliminate air and water blisters from between the fel and flesh.

2. That method of treating sheep and lamb carcasses after removal of the hide which consists in pressure rubbing towards egress openings to expel the fluid contents of air and water pockets between the fel and flesh.

3. That method of improving the saleability and keeping qualities of young animal carcasses which consists in pressure rubbing after de-hiding and prior to refrigeration to expel the fluid contents of air and water pockets between the fel and flesh.

4. That method of removing air and water pockets from between the fel and flesh of sheep and lamp carcasses which consists in providing egress openings at definite points and rubbing the fel with applied pressure towards said points after dehiding to expel the fluid contents of said pockets and to insure uniform adherence of the fel to the underlying flesh.

HERMAN H. HAZEKAMP.